United States Patent [19]
Stavroudis

[11] Patent Number: 5,225,931
[45] Date of Patent: Jul. 6, 1993

[54] SYSTEM OF REFLECTIVE TELESCOPE BAFFLES USING CONIC SECTIONS OF REVOLUTION

[75] Inventor: Orestes N. Stavroudis, Sunnyvale, Calif.

[73] Assignee: The United States of America as represented by the Secretary of the Air Force, Washington, D.C.

[21] Appl. No.: 829,809

[22] Filed: Jan. 31, 1992

[51] Int. Cl.⁵ .............................................. G02B 27/00
[52] U.S. Cl. ................................... 359/601; 359/611; 359/399; 250/352
[58] Field of Search ............... 359/601, 611, 613, 366, 359/399; 250/352, 353

[56] References Cited

U.S. PATENT DOCUMENTS 3,699,471 10/1972 Mulready et al. ................. 331/94.5
4,217,026 8/1980 Radovich ............................ 359/611
4,542,963 9/1985 Linlor .................................. 359/399
4,598,981 7/1986 Hallam et al. ..................... 359/366
4,820,923 4/1989 Wellman ............................. 250/352

Primary Examiner—Loha Ben
Attorney, Agent, or Firm—Robert L. Nathans; Donald J. Singer

[57] ABSTRACT

An optical system with a tube having an open front end and a back end, imaging optics mounted in the tube and a plurality of light reflective baffle portions rotationally symmetric with respect to the optical axis, and wherein first baffle portions are configured as ellipsoids of revolution, all with foci lying adjacent edge portions of the open front end of the tube and facing the the open front end, and wherein the second baffle portions are configured as hyperboloids of revolution facing away from the open end and inwardly of the tube.

12 Claims, 3 Drawing Sheets

SYSTEM OF REFLECTIVE TELESCOPE BAFFLES USING CONIC SECTIONS OF REVOLUTION

STATEMENT OF GOVERNMENT INTEREST

The invention described herein may be manufactured and used by or for the Government for governmental purposes without the payment of any royalty thereon.

BACKGROUND OF THE INVENTION

This invention relates to the field of optical devices incorporating a plurality of annular reflective baffles therein which prevent off axis rays from reaching a focal plane of the optical device.

Incoming light entering a telescope from a direction that is not parallel to the optical axis of the telescope can degrade the quality of the desired image if the off axis light is not intercepted. Reflective baffles positioned within the bore of the telescope are disclosed in U.S. Pat. No. 3,488,103 issued to Davis, who teaches the use of a reflecting baffle having concave, elliptical surfaces facing the direction that such off axis rays enter the optical device. In order for the disclosed device to exclude off axis radiation to a sufficient extent, the field of view must be substantially reduced. See also U.S. Pat. No. 4,217,026 issued to Radovich. A number of other prior art devices of this type are discussed in U.S. Pat. No.4,542,963 issued to Linlor, and incorporated by reference herein. Other prior art devices employ baffles in which a substantial portion of light rays are trapped and converted to heat which is undesirable.

BRIEF SUMMARY OF THE INVENTION

It is thus an object of the present invention to provide a baffle arrangement that efficiently excludes almost all unwanted light and furthermore does not trap rays therein to produce heat.

In accordance with a preferred embodiment of the invention, a plurality of annular light reflecting baffles are positioned between the open front end of the telescope and the imaging optics at rear inside portions of the telescope. The annular light reflective baffles each comprise a first baffle portion having an elliptical cross section facing the open front end of the telescope and a second baffle portion having a cross section of a hyperbola and facing away from the open front end. The result is to efficiently reject unwanted light to improve image quality, to protect the optical components from possible damage, and to better control the thermal load on the system. Also, since the reflective baffle surfaces have conic sections, rather than sections of higher order equations, the time to manufacture the device is reduced which also saves costs.

BRIEF DESCRIPTION OF THE DRAWING

Other objects, features, and advantages of the present invention will become apparent upon study of the following description taken in conjunction with the drawings in which.

DETAILED DESCRIPTION OF THE INVENTION

Figure 1:
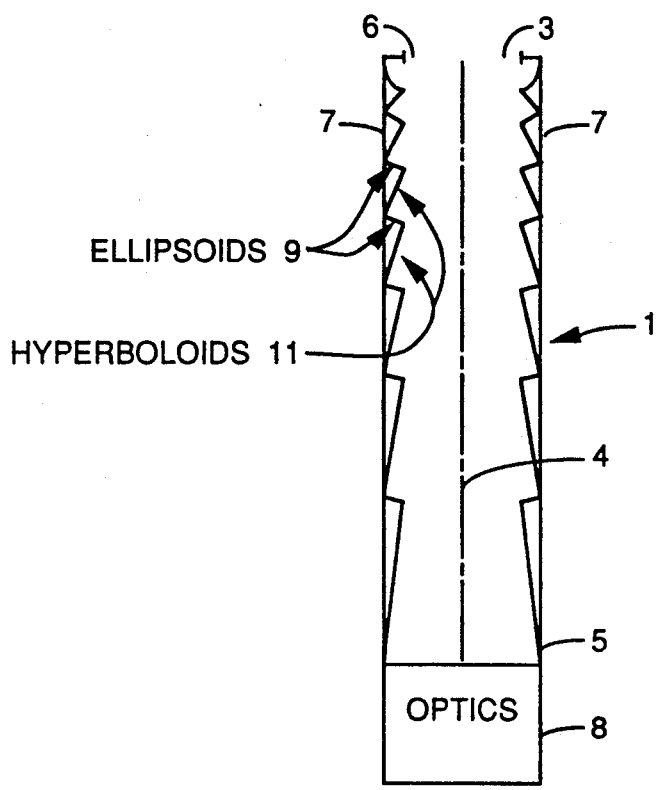
FIGS. 1, 5 and 6 illustrate cross-sections through a cylindrical telescope of a preferred embodiment of the invention.

Referring now to FIG. 1, a telescope tube 1 has an open front end 3 and a back end portion 5 with imaging optics 8 mounted in the back end. Optical axis 4 extends lengthwise of tube 1 and the aforesaid annular ring-like reflective baffles 7 extend around the inside surface of the tube and each have a first reflective baffle portion 9 of a conic cross section. More specifically this conic cross section is an ellipse having all foci lying at the edge of the telescope's entrance aperture 3. First baffle portions 9 face the opening 3 as shown, and may also be described as configured as ellipsoids of revolution, or perhaps better described as oblate spheroids. The second baffle portions 11 face away from the opening 3 and inwardly toward the optics 7, and have cross sections which are hyperbolas also with foci lying adjacent the edge portions 6 of the opening 3. The resulting surface of each of the second reflective baffle portions 11 is thus a hyperboloid of one sheet; see the top of page 1569 of Van Nostrands Scientific Encyclopedia, sixth edition, 1983. Regarding a discussion of the nature of the various types of conic sections mentioned above (ellipsoids and hyperboloids), see pages 755-756 of this same Encyclopedia.

Meridial rays, that is rays lying in a plane containing the telescope axis 4, entering the aperture 3 enter between the two foci of every ellipsoid. If such a ray is intercepted by an ellipsoid, then it will be reflected back toward the region between the two foci. If it is intercepted by another baffle before reaching the aperture 3, it will be reflected again off of the baffle 11 which is a hyperboloid. Since the ray was reflected by the ellipsoid back toward one region between the two foci of the hyperboloid, it will be reflected again out between these two foci and therefore out of the entrance aperture 3. If the ray entering the entrance aperture 3 is first intercepted by a hyperboloid, then the ray path just described will be reversed and the ray will also be reflected out of the system.

Calculations indicate an almost total rejection of unwanted light. The reflective baffle surfaces being conic sections of revolution, are easier to fabricate as mentioned above.

Figure 2:
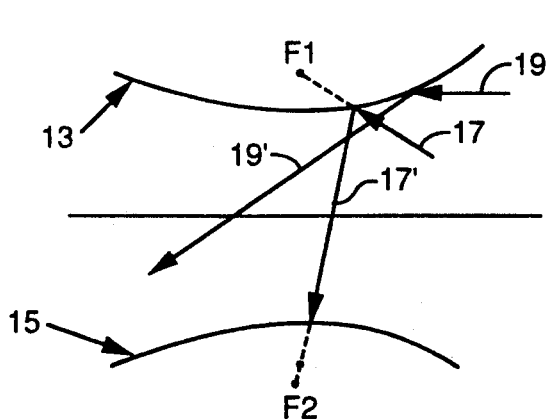
FIGS. 2 and 3 indicate reflective properties of hyperboloidal and ellipsoidal reflective surfaces respectively.
Figure 3:
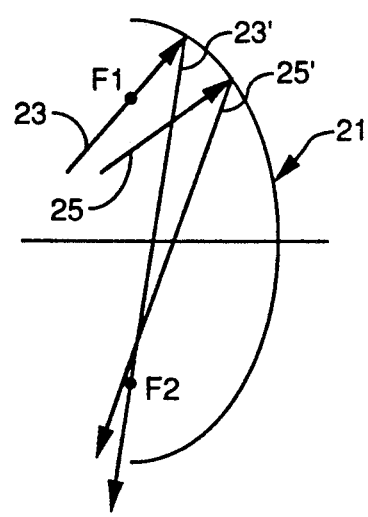

FIGS. 2 and 3 illustrate basic ray properties utilized in the present invention. In FIG. 2, a hyperboloidal surface 13 and a second like surface 15 are illustrate along with foci F1 and F2 which are the foci of the hyperbolas. Ray 17, directed to pass through F1, is reflected to produce ray 17' which is directed at F2. Ray 19 which passes between the foci reflects off the surface to produce ray 19' and which exits between the foci. In FIG. 3, F1 and F2 are the foci of the ellipsoid. Ray 23 passes through focus F1 and is reflected off ellipsoidal reflective surface 21 to form ray 23', which in turn exits through the opposite focus F2. Rays which pass between the foci such as 25, reflect off the surface to form 25' which exits between the foci.

Figure 4:
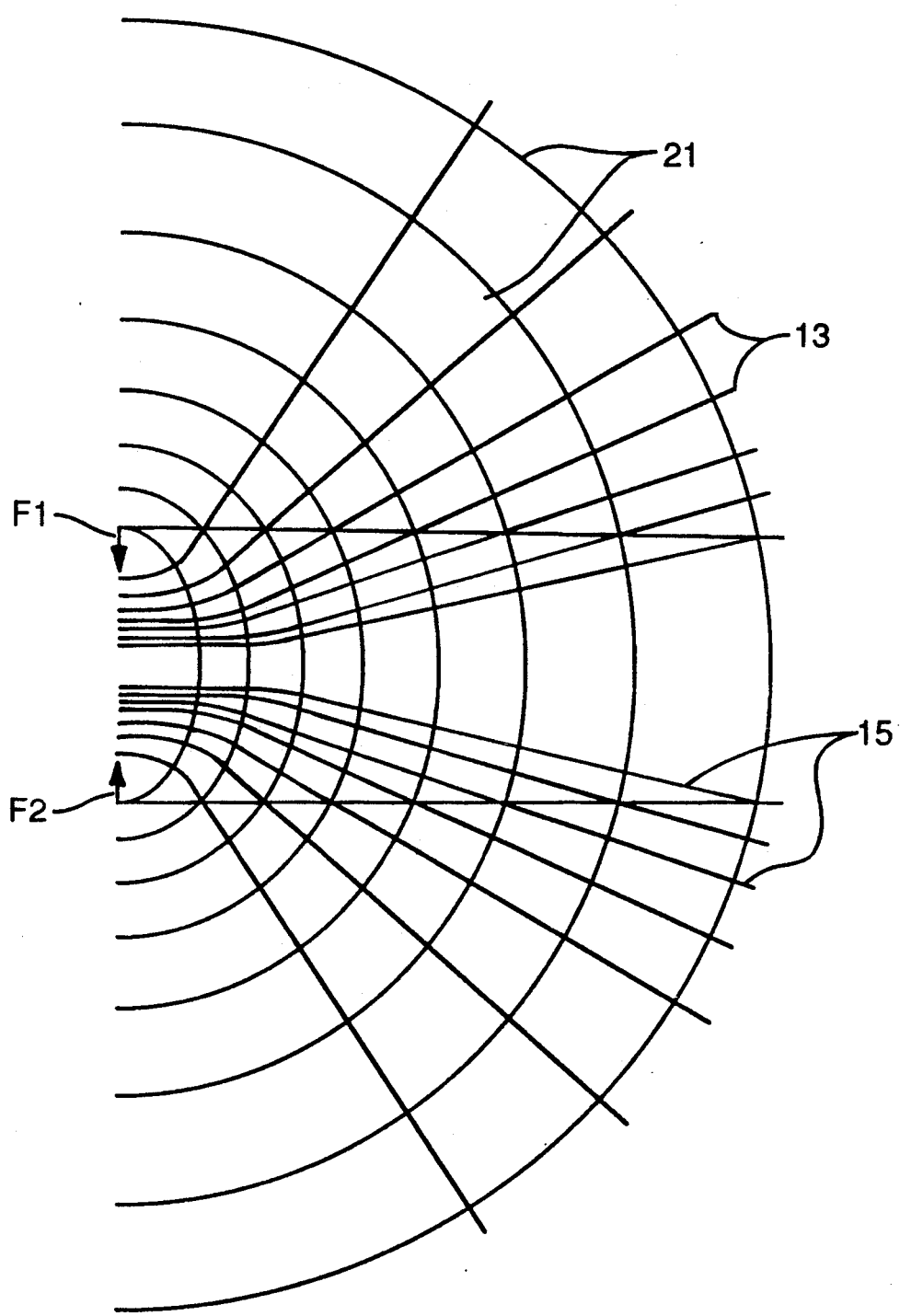
FIG. 4 is a cross-sectional view of ellipsoidal/hyperboloidal geometry relevant to the baffle geometry of FIGS. 1, 5 and 6.

In FIG. 4, a family of ellipsoidal surfaces 21 are shown along with a first family of hyperboloidal surfaces 13 and a second family of hyperboloidal surfaces 15. Note that F1 and F2 are the common foci of the two families of hyperboloidal surfaces and the ellipsoidal surfaces. As previously set forth, and in accordance with the present invention, these common foci are positioned at edge portions 6 of the entrance aperture 3 of the telescope as shown in FIG. 5.

Figure 5:
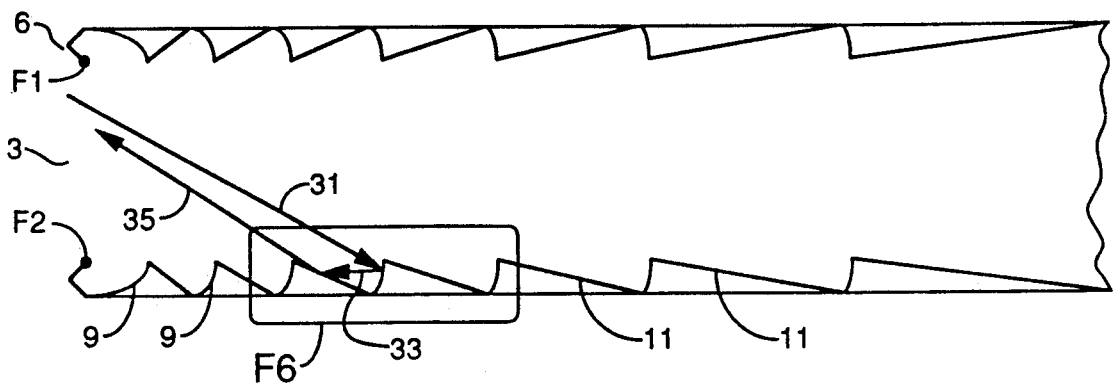
Figure 6:
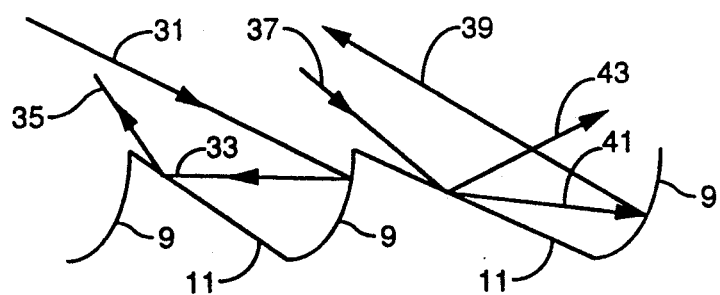

FIG. 6 is an enlarged portion of F6 of FIG. 5. A first incoming ray 31 is initially reflected off ellipsoidal reflector 9, also of FIG. 1, to form ray 33 which in turn is reflected off hyperboloidal reflector 11 to form ray 35, while a second ray 37 is initially reflected off hyperboloidal reflector 11 to form ray 41 which is in turn reflected off ellipsoidal reflector 9 to produce ray 39. Other rays are also produced such as 43.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. An optical system which comprises a tube having an optically open front end and a back end, imaging optics mounted in said tube with an optical axis extending lengthwise of said tube, baffle means extending around a bore of said tube, said optical axis being free of obstruction from said baffle means, and said baffle means having a plurality of first and second light reflective baffle portions rotationally symmetric with an axis of symmetry coinciding with said optical axis, and wherein said first baffle portions are conic sections of revolution, all with foci lying adjacent edge portions of the open front end of said tube and facing said open front end, and wherein said second baffle portions are conic sections of revolution, also with foci lying at edge portions of the open front end of said tube and facing away from the open front end of said tube.

2. The optical system of claim 1 wherein said baffle means are configured as annular rings positioned upon inside surfaces of said tube between said optically open front end and said imaging optics.

3. The apparatus of claim 2 wherein said optical system comprises a telescope.

4. The apparatus of claim 1 wherein said optical system comprises a telescope.

5. An optical system which comprises a tube having an optically open front end and a back end, imaging optics mounted in said tube with an optical axis extending lengthwise of said tube, baffle means extending around a bore portion of said tube, said optical axis being free of obstruction from said baffle means, and said baffle means having a plurality of light reflective baffle portions rotationally symmetric with an axis of symmetry coinciding with said optical axis, and wherein said first baffle portions are configured as ellipsoids of revolution, all with foci lying adjacent edge portions of the open front end of said tube and facing said open front end, and wherein said second baffle portions are configured as hyperboloids of revolution of one sheet also with foci lying at edge portions of the open front end of said tube and facing away from the open front end of said tube.

6. The optical system of claim 5 wherein said baffle means are configured as annular rings positioned upon inside surfaces of said tube between said optically open front end and said imaging optics.

7. The apparatus of claim 6 wherein said optical system comprises a telescope.

8. The apparatus of claim 5 wherein said optical system comprises a telescope.

9. An optical system which comprises a tube having an optically open front end and a back end, imaging optics mounted in said tube with an optical axis extending lengthwise of said tube, baffle means extending around a bore of said tube, said optical axis being free of obstruction from said baffle means, and said baffle means having a plurality of first and second light reflective portions rotationally symmetric with an axis of symmetry coinciding with said optical axis, and wherein said first baffle portions have elliptical cross sections, all with foci lying adjacent edge portions of the open front end of said tube and facing said open front end, and wherein said second baffle portions have hyperbolic cross sections, also with foci lying at edge portions of the open front end of said tube and facing away from the open front end of said tube.

10. The optical system of claim 9 wherein said baffle means are configured as annular rings positioned upon inside surfaces of said tube between said optically open front end and said imaging optics.

11. The apparatus of claim 10 wherein said optical system comprises a telescope.

12. The apparatus of claim 9 wherein said optical system comprises a telescope.

* * * * *